United States Patent
Yu

(10) Patent No.: US 11,537,393 B2
(45) Date of Patent: Dec. 27, 2022

(54) SYSTEMS AND METHODS FOR MANAGING STATES OF DEPLOYMENT

(71) Applicant: Palantir Technologies Inc., Palo Alto, CA (US)

(72) Inventor: Jonathan Yu, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 17/244,628

(22) Filed: Apr. 29, 2021

(65) Prior Publication Data

US 2021/0247977 A1 Aug. 12, 2021

Related U.S. Application Data

(63) Continuation of application No. 16/397,351, filed on Apr. 29, 2019, now Pat. No. 11,003,440, which is a (Continued)

(51) Int. Cl.
*G06F 8/71* (2018.01)
*G06F 8/65* (2018.01)
(Continued)

(52) U.S. Cl.
CPC .................. *G06F 8/71* (2013.01); *G06F 8/60* (2013.01); *G06F 8/61* (2013.01); *G06F 8/65* (2013.01);
(Continued)

(58) Field of Classification Search
CPC .............. G06F 8/60–71; G06F 16/2358; G06F 9/44505
(Continued)

(56) References Cited

U.S. PATENT DOCUMENTS

| 5,835,911 A | 11/1998 | Nakagawa |
| 6,058,373 A | 5/2000 | Blinn et al. |

(Continued)

FOREIGN PATENT DOCUMENTS

| EP | 1832976 A1 | 9/2007 | |
| EP | 2924565 A1 * | 9/2015 | ......... G06F 17/3089 |

OTHER PUBLICATIONS

Configuration Change Handling—Issue #9, github comment, Jan. 1, 2017, 2 pages, [retrieved on Apr. 22, 2022], Retrieved from the Internet: <URL:https://github.com/5minds/nconfetti/issues/9>.*
(Continued)

*Primary Examiner* — Geoffrey R St Leger
(74) *Attorney, Agent, or Firm* — Sheppard Mullin Richter & Hampton LLP

(57) ABSTRACT

Systems and methods are provided for managing states of deployment. A presence of a configuration change to be implemented at a deployment may be detected. The configuration change may include one or more commands to change a configuration of the deployment. Responsive to detecting the presence of the configuration change, information describing the configuration change may be stored in a repository. The information may be stored in an unsubstituted form and a substituted form. An interface through which configuration change information is accessible may be provided. The configuration change information may describe the configuration change at the deployment based on one or both of the unsubstituted form and the substituted form.

20 Claims, 5 Drawing Sheets

Related U.S. Application Data continuation of application No. 15/795,031, filed on Oct. 26, 2017, now Pat. No. 10,353,699.

(60) Provisional application No. 62/525,089, filed on Jun. 26, 2017.

(51) Int. Cl.
| | |
|---|---|
| *G06F 8/60* | (2018.01) |
| *G06F 8/61* | (2018.01) |
| *G06F 16/23* | (2019.01) |
| *G06F 9/445* | (2018.01) |

(52) U.S. Cl.
CPC ...... *G06F 16/2358* (2019.01); *G06F 9/44505* (2013.01)

(58) Field of Classification Search
USPC .................................. 717/120–121, 168–178
See application file for complete search history.

(56) References Cited

U.S. PATENT DOCUMENTS

| | | | |
|---|---|---|---|
| 7,555,569 | B1 | 6/2009 | O'Hare |
| 7,567,979 | B2 | 7/2009 | Prasad |
| 7,685,109 | B1 | 3/2010 | Ransil et al. |
| 8,230,394 | B2 * | 7/2012 | Clemenceau ....... G06F 9/44505 717/124 |
| 8,285,860 | B2 | 10/2012 | McGuire et al. |
| 8,346,897 | B2 | 1/2013 | Jaroker |
| 8,745,641 | B1 | 6/2014 | Coker |
| 8,819,106 | B1 | 8/2014 | Sirota et al. |
| 8,849,894 | B2 | 9/2014 | Mueller |
| 8,850,528 | B2 | 9/2014 | Van Biljon et al. |
| 8,904,477 | B2 | 12/2014 | Barton et al. |
| 9,256,657 | B1 | 2/2016 | Evenson et al. |
| 9,419,856 | B1 | 8/2016 | Chawla et al. |
| 9,521,194 | B1 | 12/2016 | Gabrielson |
| 9,880,864 | B2 | 1/2018 | Koufogiannakis |
| 9,893,940 | B1 | 2/2018 | Chawla |
| 9,910,697 | B2 | 3/2018 | DeArment |
| 10,191,736 | B2 | 1/2019 | Ari |
| 10,243,809 | B2 | 3/2019 | Raman |
| 2001/0054039 | A1 | 12/2001 | Weber |
| 2003/0036876 | A1 | 2/2003 | Fuller et al. |
| 2004/0044727 | A1 | 3/2004 | Abdelaziz et al. |
| 2005/0144610 | A1 | 6/2005 | Zenz |
| 2005/0182776 | A1 | 8/2005 | Yennie |
| 2005/0228711 | A1 | 10/2005 | Lahey et al. |
| 2007/0005662 | A1 | 1/2007 | Bankston et al. |
| 2007/0005801 | A1 | 1/2007 | Kumar et al. |
| 2007/0105597 | A1 | 5/2007 | Hwang |
| 2007/0157172 | A1 * | 7/2007 | Zenz .................. G06F 9/44505 717/121 |
| 2007/0168336 | A1 | 7/2007 | Ransil et al. |
| 2007/0168965 | A1 | 7/2007 | Zenz |
| 2008/0189679 | A1 | 8/2008 | Rodriguez |
| 2009/0132317 | A1 | 5/2009 | Dholakia et al. |
| 2009/0132710 | A1 | 5/2009 | Pelley |
| 2009/0217163 | A1 | 8/2009 | Jaroker |
| 2009/0222808 | A1 | 9/2009 | Faus et al. |
| 2009/0327465 | A1 | 12/2009 | Flegg et al. |
| 2010/0011098 | A1 | 1/2010 | Sanborn et al. |
| 2010/0049959 | A1 | 2/2010 | Arcese et al. |
| 2010/0054156 | A1 | 3/2010 | DeHaan |
| 2010/0057515 | A1 | 3/2010 | Gandini et al. |
| 2010/0186020 | A1 | 7/2010 | Maddhirala et al. |
| 2010/0235525 | A1 | 9/2010 | McGuire et al. |
| 2011/0131448 | A1 | 6/2011 | Vasil et al. |
| 2012/0011207 | A1 | 1/2012 | Morris |
| 2012/0158770 | A1 | 6/2012 | Benadjaoud |
| 2012/0180068 | A1 | 7/2012 | Wein et al. |
| 2013/0070917 | A1 | 3/2013 | Nuestro et al. |
| 2014/0237463 | A1 | 8/2014 | Sriram et al. |
| 2014/0310328 | A1 | 10/2014 | Charif et al. |
| 2014/0310720 | A1 | 10/2014 | Song et al. |
| 2014/0379777 | A1 | 12/2014 | Yamamoto et al. |
| 2015/0172412 | A1 | 6/2015 | Escriva et al. |
| 2015/0350318 | A1 | 12/2015 | Van Assche et al. |
| 2016/0080489 | A1 | 3/2016 | Ngo et al. |
| 2016/0132314 | A1 | 5/2016 | Solsona-Palomar |
| 2017/0139725 | A1 | 5/2017 | Koufogiannakis |
| 2017/0185686 | A1 | 6/2017 | Levi |
| 2017/0285981 | A1 | 10/2017 | DeArment et al. |
| 2017/0285982 | A1 | 10/2017 | DeArment et al. |
| 2018/0006878 | A1 | 1/2018 | Raman |
| 2018/0095739 | A1 | 4/2018 | Baset |
| 2018/0314518 | A1 | 11/2018 | Ari |
| 2018/0337821 | A1 | 11/2018 | Hall et al. |

OTHER PUBLICATIONS

Garefalakis et al., "ACaZoo: A Distributed Key-Value Store Based on Replicated LSM-Trees", 2014 IEEE 33rd International Symposium on Reliable DistributedSystems, IEEE, Oct. 6, 2014, pp. 211-220, [retrieved on Dec. 11, 2014].

Konstantinou et al., "An Architecture for Virtual Solution Composition and Deployment in Infrastructure Clouds", Proceedings of the 3.sup.rd International Workshop on Virtualization Technologies in Distributed Computing, 2008, pp. 9-18, retrieved onFeb. 4, 2019 from http://dl.acm.org/.

Notice of Allowance for U.S. Appl. No. 15/284,957 dated Oct. 25, 2017.

Notice of Allowance for U.S. Appl. No. 15/787,335 dated Nov. 23, 2018.

Official Communication for European Patent Application No. 17178290.7 dated Nov. 15, 2018.

Official Communication for European Patent Application No. 18171873.5 dated Nov. 6, 2018.

Official Communication for U.S. Appl. No. 15/284,957 dated Apr. 3, 2017.

Official Communication for U.S. Appl. No. 15/284,957 dated Jun. 2, 2017.

Official Communication for U.S. Appl. No. 15/284,959 dated Mar. 2, 2018.

Official Communication for U.S. Appl. No. 15/284,959 dated May 8, 2017.

Official Communication for U.S. Appl. No. 15/284,959 dated Oct. 19, 2017.

Official Communication for U.S. Appl. No. 15/787,335 dated Dec. 19, 2017.

Official Communication for U.S. Appl. No. 15/787,335 dated Jul. 5, 2018.

Shrivastava et al., "Architectural Support for Dynamic Reconfiguration of Large Scale Distributed Applications," Proceedings of the Architectural Support for Dynamic Reconfiguration of Distributed Systems, May 4, 1998, pp. 1-8.

Vanbrabant et al., "Configuration management as a multi-cloud enabler", Proceedings of the Second International Workshop on CrossCloud Systems, Dec. 2014, 3 pages, retrieved on Feb. 4, 2019 at http://dl.acm.org/.

* cited by examiner

SYSTEMS AND METHODS FOR MANAGING STATES OF DEPLOYMENT

CROSS REFERENCE TO RELATED APPLICATIONS

This application is a continuation of U.S. patent application Ser. No. 16/397,351, filed Apr. 29, 2019, which is a continuation of U.S. patent application Ser. No. 15/795,031, filed Oct. 26, 2017, now U.S. Pat. No. 10,353,699, which claims the benefit under 35 U.S.C. § 119(e) of U.S. Provisional Application Ser. No. 62/525,089, filed Jun. 26, 2017, the content of which is incorporated by reference in its entirety into the present disclosure.

FIELD OF THE INVENTION

This disclosure relates to approaches for managing states of deployment.

BACKGROUND

Under conventional approaches, software/hardware deployments may be installed, upgraded, and/or otherwise changed at different times by different entities. Tracking changes of a deployment may require complex version control, which may be difficult to navigate. Tracking changes of multiple deployments may further complicate the use of version control.

SUMMARY

Various embodiments of the present disclosure may include systems, methods, and non-transitory computer readable media configured to manage states of deployment. A presence of a configuration change to be implemented at a deployment may be detected. The configuration change may include one or more commands to change a configuration of the deployment. Responsive to detecting the presence of the configuration change, information describing the configuration change may be stored in a repository. The information may be stored in an unsubstituted form and a substituted form. An interface through which configuration change information is accessible may be provided. The configuration change information may describe the configuration change at the deployment based on one or both of the unsubstituted form and the substituted form.

In some embodiments, the presence of the configuration change may be detected at a configuration management server. In some embodiments, the presence of the configuration change may be detected based on a comparison of current commit values and prior commit values.

In some embodiments, the repository may be a version control repository. In some embodiments, storing the information describing the configuration change in the repository may include creating a first file for the information stored in the unsubstituted form and a second file for the information stored in the substituted form, and committing the first file and the second file to the repository.

In some embodiments, the unsubstituted form may describe the command(s) with substitution variables. The substitution variables may enable determination of an evaluated expression of the command(s). The unsubstituted form may include/be the raw expression(s) and the substituted form may include/be the evaluated expression(s).

In some embodiments, the substituted form may describe the command(s) with substituted values. The substituted values may enable determination of a substituted expression of the command(s).

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
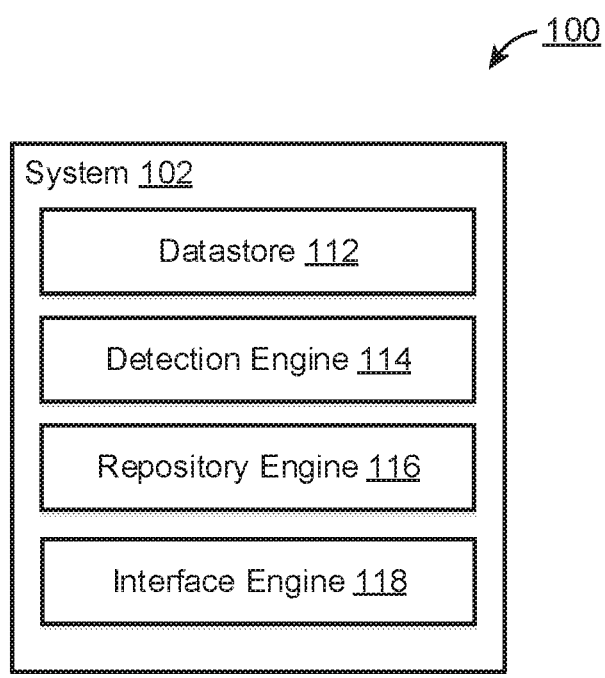
FIG. 1 illustrates an example environment for managing states of deployment, in accordance with various embodiments.

A claimed solution rooted in computer technology overcomes problems specifically arising in the realm of computer technology. The approach disclosed herein enables managing states of deployment. In various implementations, a computing system may detect a presence of a configuration change to be implemented at a deployment. The presence of the configuration change may be detected at a server (e.g., configuration management server). The presence of the configuration change may be detected, for example, based on an alert (e.g., from the server) or a comparison of a current configuration state and a previous configuration state detected at the server. The configuration change may include one or more commands to change the configuration of the deployment (e.g., installing, updating, modifying one or more software packages at the deployment). The deployment may apply the configuration change locally on disk.

For example, deployments of software/hardware in different computing systems, such as nodes within a network, may be facilitated by a configuration server. Configuration changes relating to release, installation/uninstallation, activation/deactivation, update/roll-back, modification, and/or other configuration changes of software (or a portion of software) to be implemented at a node may be received at a configuration management server. The configuration change may then be locally applied to the node (e.g., locally applied to disk of the node). By monitoring configuration changes received at the configuration management server, changes to be applied to different deployments may be detected. Tracking the configuration changes received at the configuration management server may enable centralized tracking of configuration changes to be implemented in different deployments.

Responsive to detecting the presence of the configuration change, information describing the configuration change may be stored in a repository (e.g., version control repository, such as Git repository). The information describing the configuration change may be stored in an unsubstituted form and a substituted form. The unsubstituted form may describe the command(s) with substitution variables. Substitution variables may refer to expressions/variables that are used to retrieve and/or that are replaced with evaluated values (substituted values) to implement the configuration change. The substituted form may describe the command(s) with substituted values in the place of the substitution variables. For example, substitution variables in a command may include handlebars expressions (e.g., {{Host.hostname} }) and the substituted values may include evaluated values (e.g., strings, such as "host.example.com") retrieved based on and/or used in place of the handlebars expressions to implement the configuration change. The unsubstituted form may describe the command using the handlebars expressions and the substituted form may describe the command using the evaluated values. The repository may be accessed to determine the configuration change. The configuration change may be determined based on one or both of the substituted form and the unsubstituted form.

The monitoring function and/or the information storage function may be performed by the configuration management server or another computing system/process, such as a web server separate from the configuration management server. The information stored in the repository may be accessed through the configuration management server or another computing system/process (e.g., web server separate from the configuration management server).

The approach disclosed herein enables (1) centralized tracking of configuration changes at different deployments, (2) recordation of configuration changes at different deployments using unsubstituted forms and substituted form, and (3) review of configuration changes at different deployments using unsubstituted forms and/or substituted forms. Users may review the recorded information to see how different deployments have evolved over time and/or at particular times. For example, users may use the recorded information to answer questions such as: who made a particular change at a deployment; when was a change made; why was a change made; what are historical values for a particular field at a deployment; what values have worked and what values have not worked for a particular field at a deployment. The approach disclosed herein provides users with flexibility to review the changes in deployments using substitution variables (raw expression, unrendered configuration) and/or substituted values (evaluated expression, rendered configuration). The recorded information may be written to a file system to generate a searchable index, and provide for an index of configurations that have been recorded.

FIG. 1 illustrates an example environment 100 for managing states of deployment, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., via one or more network(s)). In some embodiments, the datastore(s) may include various databases, application functionalities, application/data packages, and/or other data that is available for download, installation, and/or execution.

In various embodiments, the computing system 102 may include a datastore 112, a detection engine 114, a repository engine 116, and an interface engine 118. The datastore 112 may include structured and/or unstructured sets of data that can be divided/extracted for provisioning when needed by one or more components of the environment 100. The datastore 112 may include one or more repositories (e.g., version control repository, Git repository, etc.) for storing configuration changes to be implemented at one or more deployments. The datastore 112 may include different data analysis modules that facilitate different data analysis tasks, patches for the applications/systems, custom application/ functionalities built for particular application/systems, and/ or other information to be used in the environment 100. While the computing system 102 is shown in FIG. 1 as a single entity, this is merely for ease of reference and is not meant to be limiting. One or more components/functionalities of the computing system 100 described herein may be implemented in a single computing device or multiple computing devices.

The detection engine 114 may be configured to detect a presence of one or more configuration changes to be implemented at a deployment. A configuration change may include one or more commands to change a configuration of the deployment. For example, a configuration change may include one or more commands to release, install/uninstall, activate/deactivate, update/roll-back, modify, and/or other changes to one or more software packages (or one or more portions of a software package, such as a particular service) at the deployment. The deployment may apply the configuration change locally on disk.

The presence of the configuration change(s) may be detected at a configuration management server. States of deployments in different computing systems (e.g., nodes within a network) may be facilitated by the configuration management server. The configuration management server may provide one or more interfaces (e.g., API, command line tool, web user interface) through which users/other computing systems may specify (e.g., via HTTP request to the configuration management server) configuration changes to be implemented at one or more deployments. The detection engine 114 may detect configuration changes received at the configuration management server. Detecting configuration changes received at the configuration management server may enable the detection engine 114 to track changes to be implemented at multiple deployments from a central location.

The detection engine 114 may detect the presence of the configuration change(s) based on one or more alerts from the configuration management server. For example, responsive to reception of a configuration change (e.g., via HTTP request), the configuration management server may indicate (e.g., via flag, alert signal) that it has received a configuration change. The indication may be provided to the detection engine 114 and/or the detection engine 114 may monitor the configuration management server for the indication.

The detection engine 114 may detect the presence of the configuration(s) change based on comparison of a current commit value and a prior commit value. Configuration changes received by the configuration management server may be associated/tagged with commit values to identify the configuration changes. The commit values may include unique integers that increase monotonically. For example, changes may be tagged with commit IDs which are monotonically increasing positive integers. The commit IDs may be determined by the configuration server. Associating/tagging configuration changes with monotonically increasing integer may enable ordering of configuration changes to be implemented at deployments. Associating/tagging configuration changes with monotonically increasing integer enables a user/computing system to figure out in which order the configuration changes were received/implemented and/or to locate particular configuration changes. The detection engine 114 may detect the presence of the configuration change by looking at the value of the current commit value (the value to be associated/tagged to the current/next configuration change) and comparing that value to the value previously looked at by the detection engine 114. If the values are the same, then the detection engine 114 may determine that a new configuration change has not been received by the configuration management server. If the values are not the same (the current commit value is larger than the previous commit value seen by the detection engine 114), then the detection engine 114 may determine that one or more new configuration changes have been received by the configuration management server.

The repository engine 116 may be configured to, responsive to detection of a presence of one or more configuration changes, store information describing the configuration change(s) in a repository (e.g., version control repository, such as Git repository). For example, the repository engine 116 may store information describing the configuration change(s) in a repository of the datastore 112. Storage of information describing the configuration change(s) in other locations are contemplated.

The repository engine 116 may store the information describing the configuration change(s) in an unsubstituted form and a substituted form. The unsubstituted form may describe the configuration change(s) with substitution variables. Substitution variables may refer to expressions/variables that are used to retrieve and/or that are replaced with evaluated values (substituted values). Substitution variables may be used to templatize configurations. The substitution variables may enable determination of an evaluated expression of the command(s) implementing the configuration change(s). The unsubstituted form may include/be the raw expression(s) and the substituted form may include/be the evaluated expression(s). For example, the unsubstituted form may describe the command(s) implementing the configuration change(s) using handlebars expressions.

The substituted form may describe the configuration changes with substituted values. Substituted values may refer to values that are evaluated based on substitution variables of command(s) implementing configuration change(s). The substituted values may enable determination of a substituted expression of the command(s) implementing the configuration change(s). For example, substitution variables in a command may include handlebars expressions (e.g., {{Host.hostname}}) and the substituted values may include evaluated values (e.g., strings, such as "host.example.com") retrieved based on and/or used in place of the handlebars expressions to implement the configuration change.

In some embodiments, the repository engine 116 may store the information describing the configuration change(s) in a repository by creating separate files for different forms of recordation. The repository engine 116 may create one file for the information stored in the unsubstituted form and another file for the information stored in the substituted form. The unsubstituted form file and the substituted form file may be organized into separate directories (e.g., /substituted, /unsubstituted). The repository engine 116 may generate particular path(s) for the service(s) affected by the configuration change and layout the stored information in the respective path(s). The repository engine 116 may commit the unsubstituted form file and the substituted form file to the repository.

The interface engine 118 may be configured to provide one or more interfaces through which users may access configuration change information. The interface(s) may include application program interface(s) and/or user interface(s) through which the configuration change information is accessible. The interface(s) may provide one or more ways for users/computing systems to view/interact with the repository. For example, the interface(s) may be a command line interface (CLI), a web user interface, a plugin interface (e.g., a Git plugin for a VIM editor), and/or other interfaces. For example, the interface engine 118 may provide one or more APIs that may be used by users/computing systems to search, retrieve, and/or display the configuration change information. As another example, the interface engine 118 may provide one or more user interfaces (e.g., web user interface) through which users may enter/select commands to search, retrieve, and/or display the configuration change information. The interface(s) provided by the interface engine 118 may enable the users/computing systems to access the configuration change information using the unsubstituted form and/or the substituted form.

The configuration change information may describe the configuration change(s) at particular deployment(s) based on one or both of the unsubstituted form and the substituted form. The unsubstituted form may describe the configuration change(s)/command(s) implementing the configuration change(s) with substitution variables. The substitution variables may enable determination of an evaluated expression of the command(s) implementing the configuration change(s). For example, the unsubstituted form may describe the command(s) implementing the configuration change(s) using handlebars expressions.

The substituted form may describe the configuration change(s)/command(s) implementing the configuration change(s) with substituted values. The substituted values may enable determination of a substituted (e.g., evaluated) expression of the command(s) implementing the configuration change(s). For example, substitution variables in a command may include handlebars expressions and the substituted values may include evaluated values retrieved based on and/or used in place of the handlebars expressions to implement the configuration change.

Based on the unsubstituted form and/or the substituted form, the users may review the configuration change information to obtain information about changes in deployments. For example, the users may see when a particular file was created, who created the particular file, the values of the particular file, when and/or by whom the values were changed, how a particular value compares with prior values and/or subsequent values, and/or other information about the evolution of a particular deployment.

In some embodiments, the interface engine 118 may be configured to update the configuration change information to be presented based on the substituted form. Because the unsubstituted form includes raw values (e.g., templatized values) of the commands used to implement configuration changes, the configuration change information presented based on the unsubstituted form is generally accurate/current regardless of the time when the configuration change information is accessed. That is, because the unsubstituted form includes raw values of commands entered to change configuration of a deployment, a user may see those raw values regardless of the time when the unsubstituted form is accessed.

On the other hand, the configuration change information presented based on the substituted form may not be accurate/current based on when the configuration change information is accessed. This is because the substituted form includes evaluated values of commands entered to change configuration of a deployment. The values may be evaluated when the commands are entered and/or processed. If the process for evaluating values of commands changes (or the underlying data changes), then the substituted form may include evaluated values which are not accurate/current when the configuration change information is accessed. For example, a command entered to change configuration of a deployment may include handlebars expressions that require discovery of a particular URL (e.g., for authentication). This URL may not be hardcoded, but may be dynamically changed based on time and/or other information (e.g., software version). Thus, the URL (evaluated value) that is accessed during the implementation of the configuration change may be different than the URL that would be accessed at the time when the corresponding command(s) are retrieved as part of the configuration change information. While the presentation of the URL accessed during the configuration change (historic value) may be valuable to a user/computing system, the presentation of the current URL (current value) may provide additional value by allowing the user/computing system to have ready access to the current URL. Thus, in some embodiments, the interface engine 118 may be configured to update the information stored in the substituted form to present an updated evaluated value that is current (or approximated) as of the time of access of the configuration change information.

Figure 2:
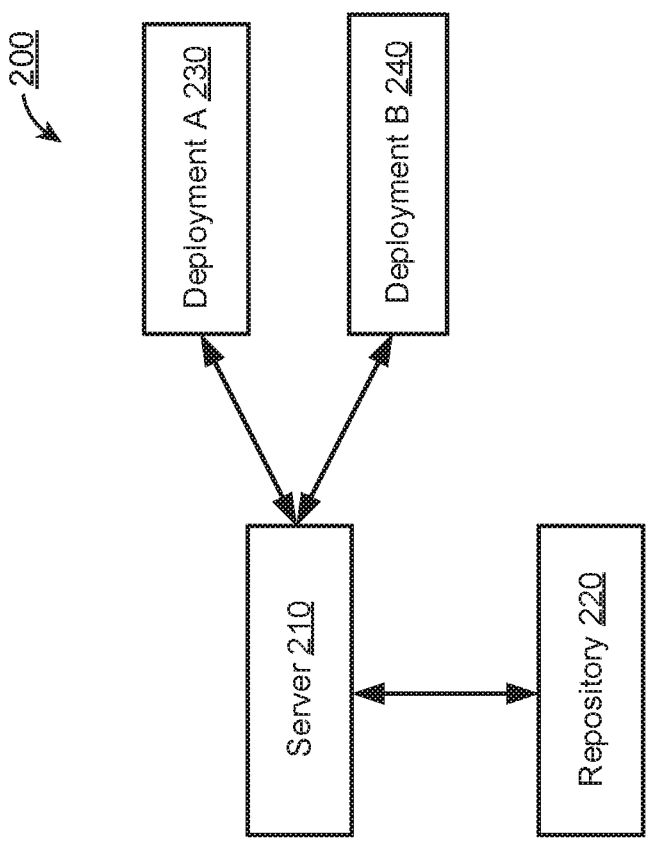
FIG. 2 illustrates an example environment for managing states of deployment, in accordance with various embodiments.

FIG. 2 illustrates an example environment 200 for managing states of deployment, in accordance with various embodiments. The example environment 200 may include a server 210, a repository 220, a deployment A 230, and a deployment B 240. The server 210, the deployment A 230, and the deployment B 240 may include/be implemented by one or more processors and memory. The processor(s) may be configured to perform various operations by interpreting machine-readable instructions stored in the memory. In some embodiments, the server 210 may be configured to implement some, or all, of the functionalities of the computing system 102 as described above. The repository 220 may be a version control repository, such as Git repository.

The server 210 may be a configuration management server for the deployment A 230 and the deployment B 240. The server 210 may provide one or more interfaces (e.g., API, command line tool, web user interface) through which users/other computing systems may specify (e.g., via HTTP request to the configuration management server) configuration changes to be implemented at the deployment A 230 and/or the deployment B 240.

The server 210 may perform the monitoring function as described above with respect to the detection engine 114, the information storage function as described above with respect to the repository engine 116, and/or the information access function as described above with respect to the interface engine 118. For example, a configuration change to be implemented at the deployment A 230 and/or the deployment B 240 may be received by the server 210. The server 210 may detect the presence of the configuration change (e.g., based on an alert and/or comparison of commit values). Responsive to the detection of the presence of the configuration change, the server 210 may store information describing the configuration change in the repository 220. The information describing the configuration change may be stored in an unsubstituted form and a substituted form. The server 210 may provide one or more interfaces (e.g., API, user interface) through which users may access configuration change information. The configuration change information may describe the configuration change(s) at the deployment A 230 and/or the deployment B 240 based on one or both of the unsubstituted form and the substituted form. The users may review the configuration change information to see how the deployment A 230 and/or the deployment B 240 evolved over time and/or at particular times.

Figure 3:
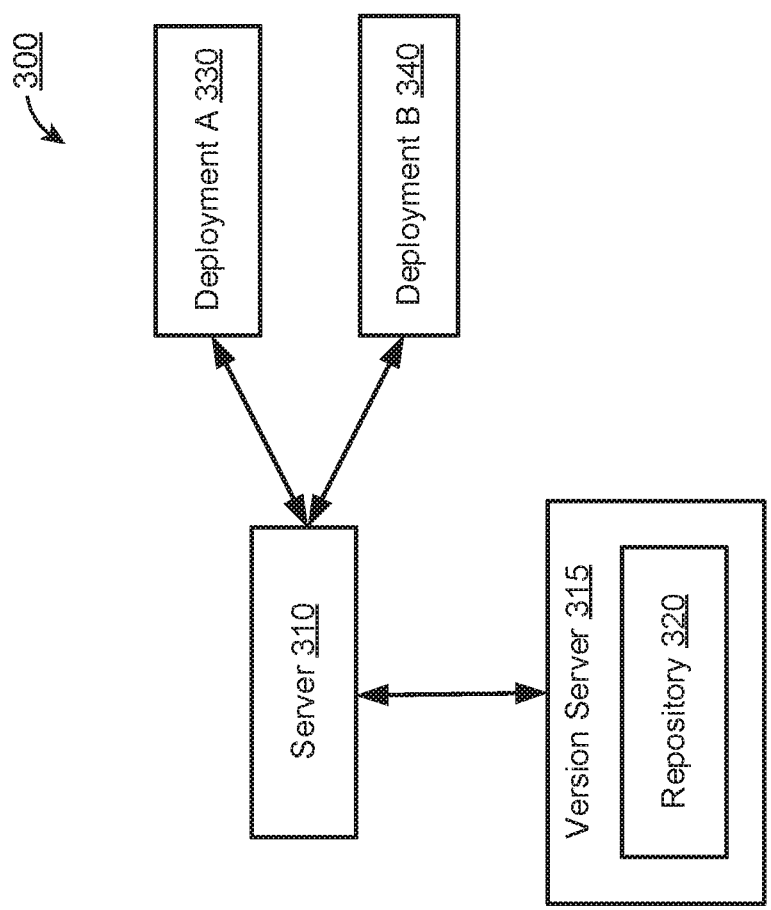
FIG. 3 illustrates an example environment for managing states of deployment, in accordance with various embodiments.

FIG. 3 illustrates an example environment 300 for managing states of deployment, in accordance with various embodiments. The example environment 300 may include a server 310, a version server 315, a repository 320, a deployment A 330, and a deployment B 340. The server 310, the version server 315, the deployment A 330, and the deployment B 340 may include/be implemented by one or more processors and memory. The processor(s) may be configured to perform various operations by interpreting machine-readable instructions stored in the memory. In some embodiments, the server 310 and/or the version server 315 may be configured to implement some, or all, of the functionalities of the computing system 102 as described above. The repository 320 may be a version control repository, such as Git repository.

The server 310 may be a configuration management server for the deployment A 330 and the deployment B 340. The server 310 may provide one or more interfaces (e.g., API, command line tool, web user interface) through which users/other computing systems may specify (e.g., via HTTP request to the configuration management server) configuration changes to be implemented at the deployment A 330 and/or the deployment B 340.

The version server 315 may include a server (e.g., web server) separate from the server 310. The version server 315 may perform the monitoring function such as described above with respect to the detection engine 114, the information storage function such as described above with respect to the repository engine 116, and/or the information access function such as described above with respect to the interface engine 118. For example, a configuration change to be implemented at the deployment A 330 and/or the deployment B 340 may be received by the server 310. The version server 315 may detect the presence of the configuration change at the server 310 (e.g., based on an alert and/or comparison of commit values). Responsive to the detection of the presence of the configuration change, the version server 315 may store information describing the configuration change in the repository 320. The information describing the configuration change may be stored in an unsubstituted form and a substituted form. The version server 315 may provide one or more interfaces (e.g., API, user interface) through which users may access configuration change information. The configuration change information may describe the configuration change(s) at the deployment A 330 and/or the deployment B 340 based on one or both of the unsubstituted form and the substituted form. The users may review the configuration change information to see how the deployment A 330 and/or the deployment B 340 evolved over time and/or at particular times.

Figure 4:
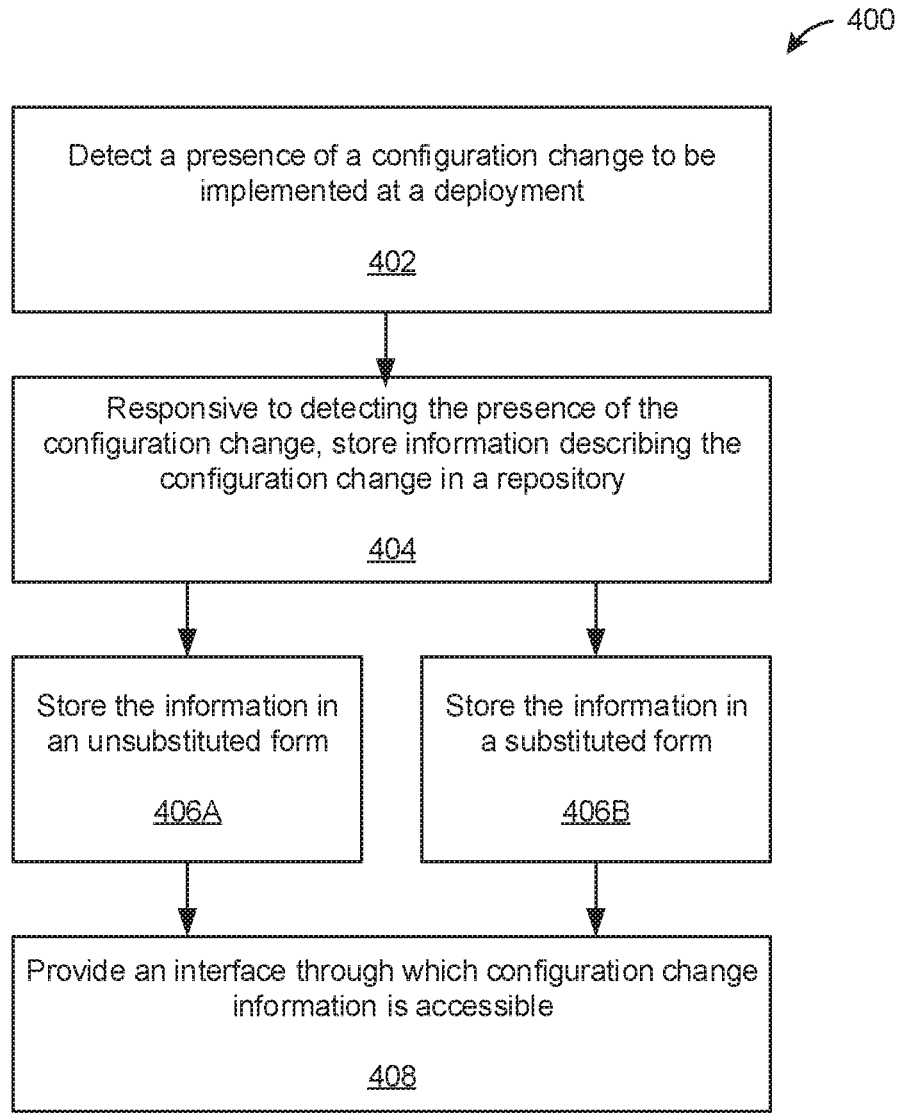
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a presence of a configuration change to be implemented at a deployment may be detected. At block 404, responsive to detecting the presence of the configuration change, information describing the configuration change may be stored in a repository. At block 406A, the information may be stored in an unsubstituted form. At block 406B, the information may be stored in a substituted form. At block 408, an interface through which configuration change information is accessible may be provided.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
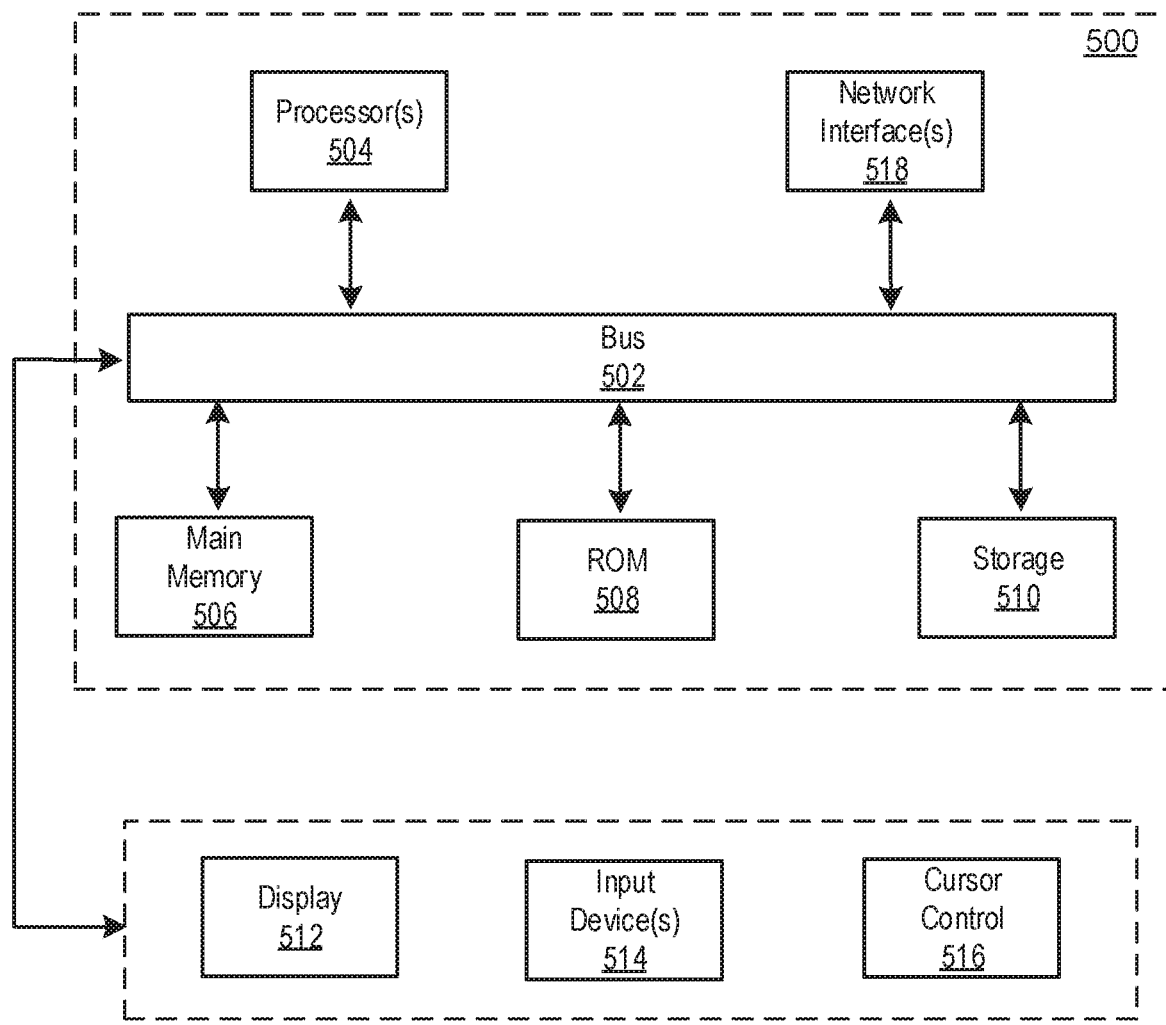
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware.

Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
receiving a command for a first configuration change associated with a software deployment, wherein the command comprises a handlebar expression, the handlebar expression comprising a first evaluated form;
in response to receiving the command, accessing a first particular link corresponding to the first evaluated form;

in response to the accessing of the first particular link, implementing the first configuration change;
updating the handlebar expression to a second evaluated form distinct from the first evaluated form;
storing information of the updated handlebar expression in a repository;
receiving a subsequent command for a second configuration change associated with the software deployment;
in response to receiving the subsequent command, accessing a second particular link corresponding to the second evaluated form; and
in response to the accessing of the second particular link, implementing the second configuration change.

2. The system of claim 1, wherein the instructions further cause the system to perform:
recording a reason that the first configuration change was made.

3. The system of claim 1, wherein the instructions further cause the system to perform:
storing first historical values corresponding to a particular field that have resulted in a successful deployment and second historical values corresponding to the particular field that have resulted in an unsuccessful deployment.

4. The system of claim 1, wherein the first evaluated form of the handlebar expression includes a first particular universal resource link (URL) and the second evaluated form includes a second particular URL.

5. The system of claim 1, wherein the storing of the information is in response to detecting a configuration change.

6. The system of claim 1, wherein an evaluated form of the handlebar expression includes a hostname.

7. The system of claim 1, wherein the storing of the information includes logging information of previous configuration changes to release, install or uninstall, activate or deactivate, update or roll-back, and modify an earlier configuration.

8. The system of claim 1, wherein the storing of the information includes generating particular paths for services affected by the configuration change.

9. The system of claim 1, wherein the updating is based on a time and a version of the software deployment.

10. A method implemented by a computing system including one or more processors and storage media storing machine-readable instructions, wherein the method is performed using the one or more processors, the method comprising:
receiving a command for a first configuration change associated with a software deployment, wherein the command comprises a handlebar expression, the handlebar expression comprising a first evaluated form;
in response to receiving the command, accessing a first particular link corresponding to the first evaluated form;
in response to the accessing of the first particular link, implementing the first configuration change;
updating the handlebar expression to a second evaluated form distinct from the first evaluated form;
storing information of the updated handlebar expression in a repository;
receiving a subsequent command for a second configuration change associated with the software deployment;
in response to receiving the subsequent command, accessing a second particular link corresponding to the second evaluated form; and
in response to the accessing of the second particular link, implementing the second configuration change.

11. The method of claim 10, further comprising: recording a reason that the first configuration change was made.

12. The method of claim 10, further comprising:
storing first historical values corresponding to a particular field that have resulted in a successful deployment and second historical values corresponding to the particular field that have resulted in an unsuccessful deployment.

13. The method of claim 10, wherein the first evaluated form of the handlebar expression includes a first particular universal resource link (URL) and the second evaluated form includes a second particular URL.

14. The method of claim 10, wherein the storing of the information is in response to detecting a configuration change.

15. The method of claim 10, wherein an evaluated form of the handlebar expression includes a hostname.

16. The method of claim 10, wherein the storing of the information includes logging information of previous configuration changes to release, install or uninstall, activate or deactivate, update or roll-back, and modify an earlier configuration.

17. The method of claim 10, wherein the storing of the information includes generating particular paths for services affected by the configuration change.

18. A non-transitory computer readable medium comprising instructions that, when executed, cause one or more processors to perform:
receiving a command for a first configuration change associated with a software deployment, wherein the command comprises a handlebar expression having a first evaluated form;
in response to receiving the command, accessing a first particular link corresponding to the first evaluated form;
in response to the accessing of the first particular link, implementing the first configuration change;
updating the handlebar expression to a second evaluated form distinct from the first evaluated form;
storing information of the updated handlebar expression in a repository;
receiving a subsequent command for a second configuration change associated with the software deployment;
in response to receiving the subsequent command, accessing a second particular link corresponding to the second evaluated form; and
in response to the accessing of the second particular link, implementing the second configuration change.

19. The non-transitory computer readable medium of claim 18, wherein the instructions further cause the one or more processors to perform:
recording a reason that the first configuration change was made.

20. The non-transitory computer readable medium of claim 18, wherein the instructions further cause the one or more processors to perform:
storing first historical values corresponding to a particular field that have resulted in a successful deployment and second historical values corresponding to the particular field that have resulted in an unsuccessful deployment.

* * * * *